United States Patent
Ha et al.

(10) Patent No.: US 10,857,519 B2
(45) Date of Patent: Dec. 8, 2020

(54) CATALYST FOR DECOMPOSING NITROGEN OXIDE AND PREPARATION METHOD THEREOF

(71) Applicant: KOREA INSTITUTE OF SCIENCE AND TECHNOLOGY, Seoul (KR)

(72) Inventors: Heon Phil Ha, Gyeonggi-do (KR); Kyung Ju Lee, Incheon (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 1402 days.

(21) Appl. No.: 13/760,309

(22) Filed: Feb. 6, 2013

(65) Prior Publication Data

US 2014/0100106 A1    Apr. 10, 2014

(30) Foreign Application Priority Data

Oct. 4, 2012  (KR) .......................... 10-2012-0110137

(51) Int. Cl.
| | | |
|---|---|---|
| *B01J 23/22* | (2006.01) | |
| *B01D 53/86* | (2006.01) | |
| *B01J 21/06* | (2006.01) | |
| *B01J 37/08* | (2006.01) | |
| *B01J 37/04* | (2006.01) | |
| *B01D 53/94* | (2006.01) | |

(52) U.S. Cl.
CPC .......... *B01J 23/22* (2013.01); *B01D 53/8628* (2013.01); *B01D 53/9418* (2013.01);
(Continued)

(58) Field of Classification Search
CPC . B01J 37/04; B01J 37/08; B01J 21/063; B01J 23/22; B01J 23/16; B01J 23/18;
(Continued)

(56) References Cited

U.S. PATENT DOCUMENTS 5,728,356 A * 3/1998 Iida ..................... B01D 53/8625
423/237
7,879,759 B2 * 2/2011 Augustine .......... B01D 53/9418
210/757
(Continued)

FOREIGN PATENT DOCUMENTS

| CN | 1283523 A | 2/2001 |
| CN | 101678326 A | 2/2001 |

(Continued)

OTHER PUBLICATIONS

Ha Heon Phil, et al; SO2 resistant antimony promoted V2O5/TiO2 catalyst for NH3-SCR of NOX at low temperatures:, Applied Catalysis B Environmental vol. 78, pp. 301-308; Available online Sep. 19, 2007.

(Continued)

*Primary Examiner* — Smita S Patel
(74) *Attorney, Agent, or Firm* — Ladas & Parry LLP

(57) ABSTRACT

Provided is a catalyst including: a support including titanium oxide; an active catalyst component including vanadium oxide; and a co-catalyst including antimony and cerium, in which the catalyst is included in a deNox reduction reaction that decomposes nitrogen oxide. The catalyst may improve sulfur poisoning tolerance characteristics while improving the deNox efficiency at a temperature in a wide range from low temperature to high temperature.

9 Claims, 10 Drawing Sheets

(52) U.S. Cl.
CPC .............. *B01J 21/063* (2013.01); *B01J 37/04* (2013.01); *B01J 37/08* (2013.01); *B01D 2251/208* (2013.01); *B01D 2251/2067* (2013.01); *B01D 2255/2065* (2013.01); *B01D 2255/20723* (2013.01); *B01D 2258/012* (2013.01)

(58) Field of Classification Search
CPC .. B01J 37/06; B01D 53/8628; B01D 53/9418; B01D 2258/012; B01D 2251/2067; B01D 2251/208; B01D 2255/2065; B01D 2255/20723; B01D 2255/2098
See application file for complete search history.

(56) References Cited

U.S. PATENT DOCUMENTS

2008/0249328 A1 10/2008 Kaduk et al.
2009/0143225 A1* 6/2009 Ha ..................... B01D 53/8628
                                                        502/247

FOREIGN PATENT DOCUMENTS

| | | |
|---|---|---|
| CN | 101947443 A | 1/2011 |
| EP | 1 682 266 B1 | 7/2006 |
| JP | 3-510541 A | 1/2004 |
| JP | 2009-214045 A | 9/2009 |
| KR | 1020020069621 A | 9/2002 |
| KR | 10-0671978 B1 | 1/2007 |
| KR | 1020120066626 A | 6/2012 |
| WO | 2011-016412 A1 | 2/2011 |

OTHER PUBLICATIONS

Wenqing Xu, et al; "Selective catalytic reduction of NO by NH3 over a Ce/TiO2 catalyst", Catalysis Communications, vol. 9, pp. 1453-1457, Available online Dec. 31, 2007.
Extended European Search Report dated Mar. 6, 2014; Appln. No. 13154042.9-1352.

* cited by examiner

CATALYST FOR DECOMPOSING NITROGEN OXIDE AND PREPARATION METHOD THEREOF

CROSS-REFERENCE TO RELATED APPLICATION

This application claims priority to and the benefit of Korean Patent Application No. 10-2012-0110137 filed in the Korean Intellectual Property Office on Oct. 4, 2012, the entire contents of which are incorporated herein by reference.

BACKGROUND OF THE INVENTION (a) Field of the Invention

A catalyst for decomposing nitrogen oxide and a preparation method thereof are provided.

(b) Description of the Related Art

Nitrogen oxide ($NO_x$) is usually produced during combustion of fossil fuel, and is generated from mobile sources such as ships or vehicles, or stationary sources such as power plants or incinerators. Nitrogen oxide is responsible for the formation of acid rain and smog and has been named as one of the main factors that contaminate the atmosphere. Recently, due to stricter regulations on the atmospheric environment being enforced, and in response thereto, a lot of studies have been conducted to use a reducing agent to decompose nitrogen oxide.

Among them, as a method of removing nitrogen oxide emitted from vehicles, ships and the like using diesel engines in stationary sources or mobile sources, a method of using ammonia and the like as a reducing agent and using a titanium oxide ($TiO_2$) support and vanadium oxide ($V_2O_5$) as a catalyst has been often used. As the catalyst, selective catalytic reduction (SCR) has been widely used.

In the case of titania-based selective catalytic reduction using ammonia as a reducing agent, deNOx efficiency at about 300° C. or more is excellent, and thus a catalyst is installed in a position where the temperature of an exhaust gas is about 300° C. or more. When the temperature of the exhaust gas is about 300° C. or less, the catalyst is used under a condition in which the temperature of the exhaust gas is artificially increased. When the use temperature of the catalyst is limited to approximately 300° C. in this way, spatial limitations may be imposed to install a catalyst and economical loss to artificially increase the temperature of the exhaust gas may occur. Therefore, according to the emission situation of the exhaust gas, demand for catalysts that use low temperature to decompose nitrogen oxide at about 300° C. or less has been increasing. According to the situation, a catalyst used at a temperature of about 400° C. or more may be needed.

Recently, as regulations on nitrogen oxide emitted from ships are internationally applied pursuant to the provisions of the International Maritime Organization (IMO) and the like, a need for a catalyst operating at low temperature is further increased, and in order to prevent a catalyst from being poisoned from sulfur included in fuel, a need for developing a catalyst having sulfur poisoning tolerance characteristics is further increased. For example, tungsten oxide may be added as a co-catalyst to a catalyst using vanadium as an active material in a titania support, and the catalyst may improve low temperature characteristics and also improve sulfur poisoning tolerance characteristics. However, there is need for a catalyst in which the characteristics are further improved.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment may improve sulfur poisoning tolerance characteristics while improving the deNox efficiency in a wide range of temperature from low temperature to high temperature.

An exemplary embodiment may provide a catalyst used in a selective reduction deNox reaction in order to improve the deNox efficiency at low and high temperatures and sulfur poisoning tolerance characteristics, and a preparation method thereof.

The catalyst according to an exemplary embodiment may be prepared by using titanium oxide ($TiO_2$) as a support to synthesize vanadium as a catalyst active component and cerium and antimony as co-catalysts, and a hydrocarbon-based compound including ammonia is used as a reducing agent. The catalyst may be prepared by mixing vanadium as a catalyst active component and precursors of antimony and cerium which are co-catalysts with titanium oxide ($TiO_2$) powder as a support material and sintering the mixture by a preparation method such as impregnation, precipitation, a sol-gel method and the like. For example, a soluble compound as a compound containing antimony such as antimony trichloride ($SbCl_3$) and the like may be used as a precursor of antimony. A soluble compound containing cerium such as cerium nitrate ($CeN_3O_9.6H_2O$) and the like may be used as a precursor of cerium. Further, ceria ($CeO_2$) may be directly mixed instead of the cerium precursor.

In the case of a catalyst used to remove nitrogen oxide of an exhaust gas by a selective reduction method, according to the diversification of a catalyst-used environment, there is need to develop a catalyst with improved sulfur poisoning tolerance characteristics while showing excellent deNox efficiency in a wide temperature range from low temperature to high temperature. In the case of technology in the related art using tungsten oxide as a co-catalyst, the deNOx efficiency may be improved over a wide temperature range, and accordingly, the slip of ammonia that is a reducing agent is decreased, and thus poisoning caused by sulfur may also be partially reduced. However, when antimony and cerium are used as co-catalysts in a titania support as in an exemplary embodiment, not only the deNOx efficiency may be further improved at a lower temperature than a catalyst in the related art, but also sulfur poisoning tolerance characteristics may be further improved. Furthermore, the catalyst according to an exemplary embodiment may be easily regenerated to the original state by increasing the temperature even though the catalyst is poisoned. In addition, the catalyst according to an embodiment also has better deNOx performance in a high temperature region than catalysts in the related art.

According to an exemplary embodiment, the deNox efficiency may be relatively improved even with the addition thereof in a smaller amount than in tungsten by using titania as a support, vanadium as a basic deNOx active material, and antimony as a co-catalyst, and by additionally adding cerium as a co-catalyst, sulfur poisoning tolerance characteristics may also further improved while further improving the deNox characteristics at low and high temperatures.

DETAILED DESCRIPTION OF THE EMBODIMENTS

Figure 1:
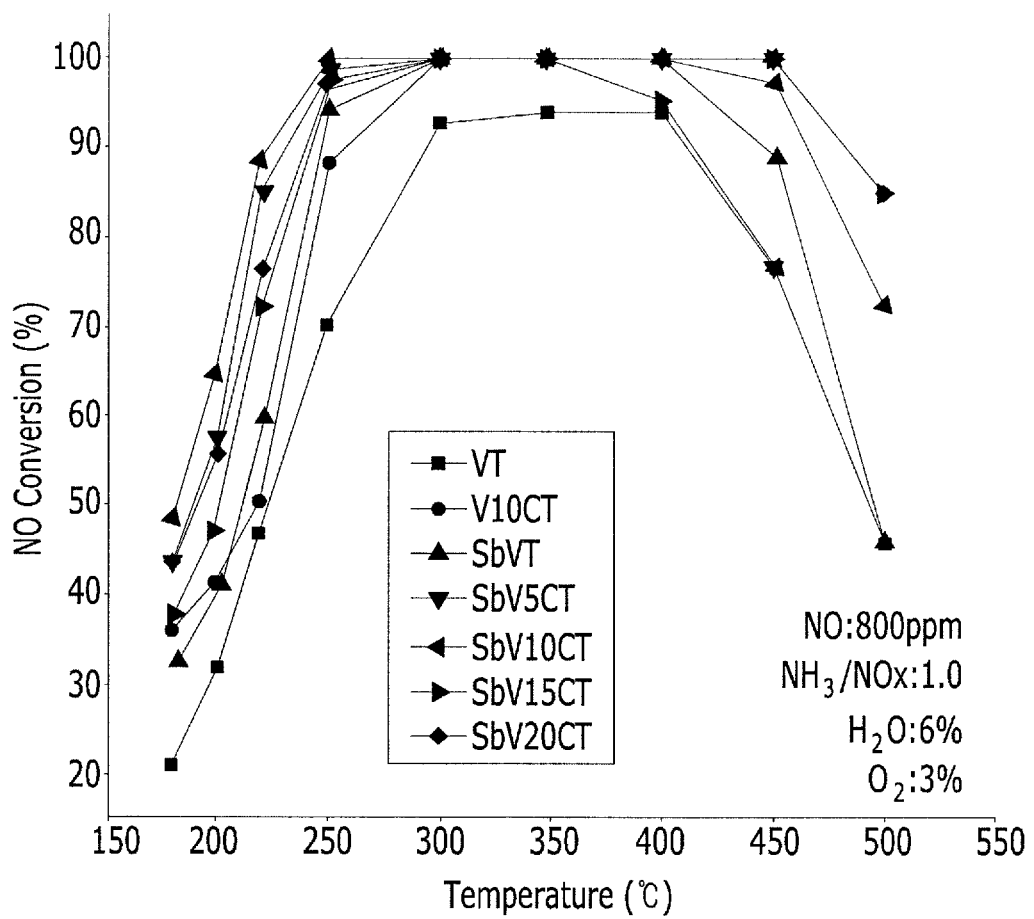
FIG. 1 is a graph illustrating the deNox efficiency according to the type of catalyst and the change in temperature.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. Further, the detailed description of the widely known technologies will be omitted.

Then, a catalyst for decomposing nitrogen oxide according to embodiments and a preparation method thereof will be described in detail.

An exemplary embodiment relates to a catalyst used to selectively remove nitrogen oxide in an exhaust gas by a reduction method, and deNOx characteristics at low and high temperatures may be improved and sulfur poisoning tolerance characteristics may be improved. The catalyst according to an exemplary embodiment may include a titanium oxide (TiO$_2$) support and vanadium oxide (V$_2$O$_5$) as an active catalyst component, and includes antimony and cerium as co-catalysts. Unlike general preparation methods of using titanium oxide (TiO$_2$) to impregnate vanadium (V) as an active material and tungsten (W) as a co-catalyst, thereby preparing a catalyst, the preparation method of the catalyst according to an exemplary embodiment may include mixing titanium oxide (TiO$_2$) that is a support material with a precursor of vanadium that is a catalyst active component and an antimony precursor and a cerium precursor, which are co-catalysts, and sintering the mixture. In this case, as a precursor of antimony, a soluble compound as a compound containing antimony and cerium, such as antimony trichloride (SbCl$_3$), cerium nitrate (CeN$_3$O$_9$.6H$_2$O) and the like may be used. As a precursor of cerium, a compound including cerium may be used, and cerium oxide instead of a cerium precursor may also be used. For example, cerium oxide powder may be used, and the cerium oxide powder has a cost cutting effect which is much higher than that of a cerium precursor. As a reducing agent necessary for a deNox reaction, ammonia, a hydrocarbon-based compound, a mixture thereof and the like may be used. For example, ammonia may be used as a reducing agent. Moreover, a deNox reducing catalyst may be a catalyst using titanium oxide as a support, vanadium oxide (V$_2$O$_5$) as an active catalyst component and antimony and cerium as co-catalysts.

Vanadium oxide, antimony and cerium may be used in amounts of approximately 1% by weight to 3% by weight, approximately 1% by weight to 3% by weight and approximately 3% by weight to 17% by weight, respectively, based on the total weight of the catalyst including a titanium oxide support, and when the components are in the content range, the deNOx efficiency in a wide range from low temperature to high temperature may be further improved and sulfur poisoning tolerance characteristics may be further improved.

The following Table 1 shows various Examples of deNox reduction catalysts. The following Examples are only examples of the present invention, but the present invention is not limited to the following Examples.

TABLE 1

| | catalyst name | TiO$_2$ | V (wt %) | Sb (wt %) | Ce (wt %) |
|---|---|---|---|---|---|
| Comparative Example 1 | SbVT | Anatase phase | 2 | 2 | |
| Example 1 | SbV5CT | Anatase phase | 2 | 2 | 5 |
| Example 2 | SbV10CT | Anatase phase | 2 | 2 | 10 |
| Example 3 | SbV15CT | Anatase phase | 2 | 2 | 15 |
| Example 4 | SbV20CT | Anatase phase | 2 | 2 | 20 |

FIG. 1 is, when ammonia was used as a reducing agent, a series of deNox efficiency data of a catalyst (VT) in which about 2% vanadium that is a catalyst active component was added to a titanium oxide (TiO$_2$) support, a catalyst (V10CT) in which 1 about 0% cerium that is a co-catalyst is added to the catalyst, a catalyst (SbVT) in which about 2% antimony oxide that is a co-catalyst was added to the catalyst, and a catalyst (SbV5CT-SbV20CT) in which cerium is added to a catalyst in which vanadium and antimony oxide were added in an amount of about 2%, respectively, while varying the content of cerium from about 5% to about 20%, according to the temperature. The amount of nitrogen oxide and ammonia used at this time was about 800 ppm, respectively. As known from FIG. 1, the deNox efficiency of a catalyst when a co-catalyst is not added shows about 90% or more at about 300° C. or more, but when antimony is added as a co-catalyst, a deNox efficiency of about 90% or more is shown from about 250° C., and thus it may be known that the addition of antimony may improve low-temperature deNox efficiency. However, as known from FIG. 1, a catalyst prepared by mixing about 2% vanadium that is a catalyst active component with a about 2% precursor of antimony and about 5% to about 15% cerium, which are co-catalysts, and sintering the mixture shows a deNox efficiency of about 90% or more even at a low temperature of about 225° C., compared to the case of impregnating about 2% vanadium that is a catalyst active component and an antimony co-catalyst on titanium oxide, and thus, it may be known that low temperature deNox performance has been improved by using antimony and cerium as co-catalysts. In the case of these catalysts, it may be known that the deNox performance may be improved even at a high temperature of about 400° C. or more. As known from the experimental results, it may be known that when the amount of cerium added is from about 5% to about 15%, the deNox efficiency is best improved in a wide range from low temperature to high temperature.

Figure 2:
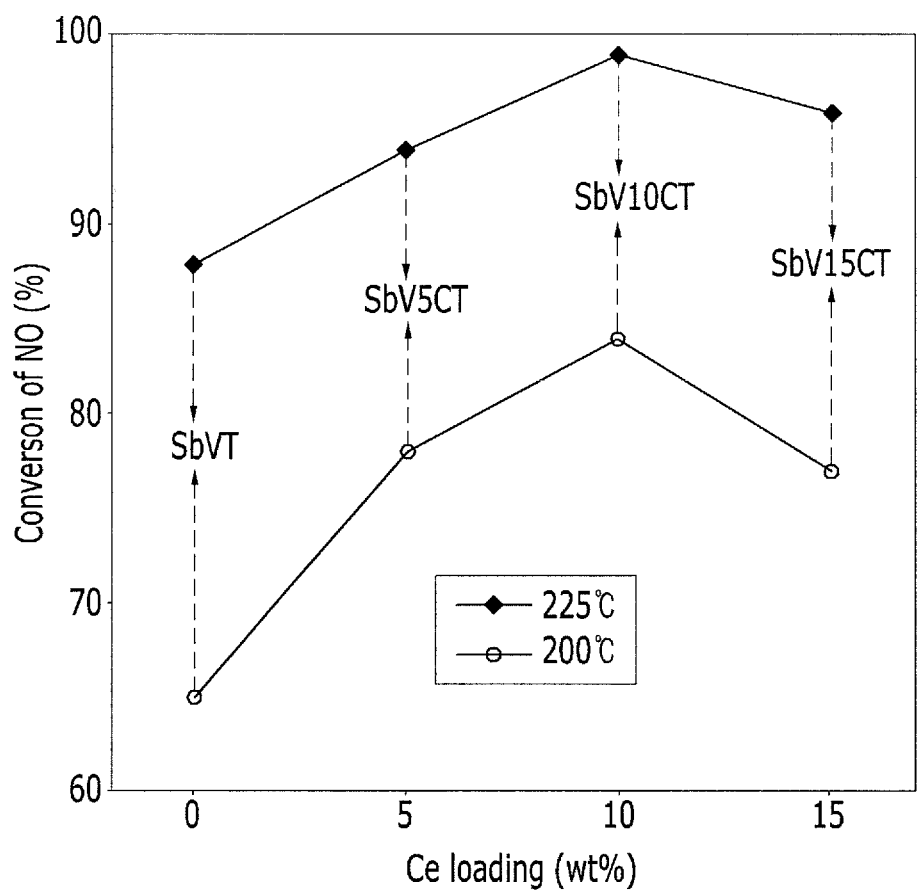
FIG. 2 is a graph illustrating the deNox efficiency according to the amount of cerium supported at a temperature of 250° C. or less.

FIG. 2 is a graph illustrating the deNox efficiency according to the amount of cerium supported at a temperature of about 250° C. or less. As known from FIG. 2, a catalyst prepared by mixing about 2% vanadium that is a catalyst active component with a about 2% antimony and about 5% to about 15% cerium, which are co-catalysts, and sintering the mixture shows a deNox efficiency of about 90% or more even at a temperature of about 225° C., compared to the case of impregnating about 2% vanadium that is a catalyst active component and an antimony co-catalyst on titanium oxide, and thus, it may be known that low temperature deNox performance has been improved.

Figure 3:
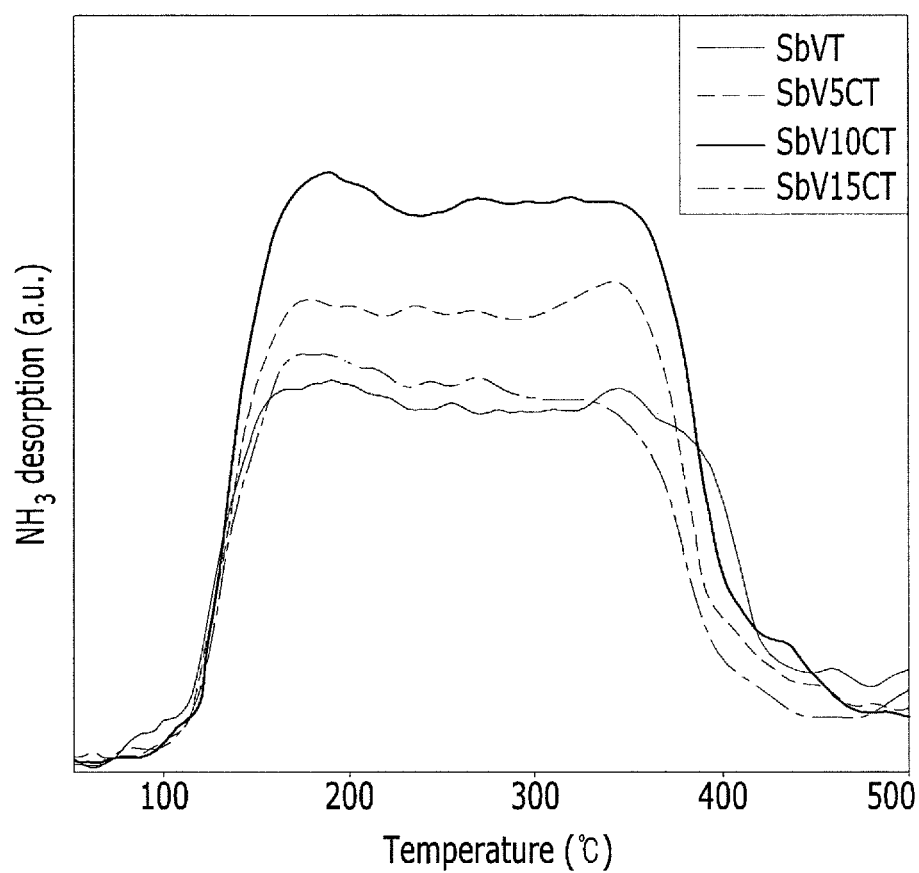
FIG. 3 is a graph illustrating the amount of ammonia adsorbed and desorbed as a result of NH$_3$-TPD (Temperature Programmed Desorption) experiments according to the amount of cerium supported.

FIG. 3 is a graph illustrating the amount of ammonia adsorbed and desorbed as a result of NH3-TPD (Temperature Programmed Desorption) experiments according to the amount of cerium supported. The amount of ammonia desorbed is caused by the peak area, and as known from FIG. 3, it may be known that the ammonia desorption peak includes two peaks of a physisorbed peak with Bronsted acid points at approximately 80° C. to approximately 200° C. and a chemisorbed peak with Lewis acid points at approximately 250° C. to approximately 400° C., and a catalyst with cerium supported has more Lewis acid points than a catalyst with no cerium supported. The result of deNOx efficiency is affected by the amount of ammonia adsorbed and desorbed, and thus it may be known that a catalyst with cerium supported in an amount from about 5% to about 15% has more acid points than a catalyst with cerium supported when compared to the deNox efficiency, and thus the deNOx efficiency has been improved.

Figure 4:
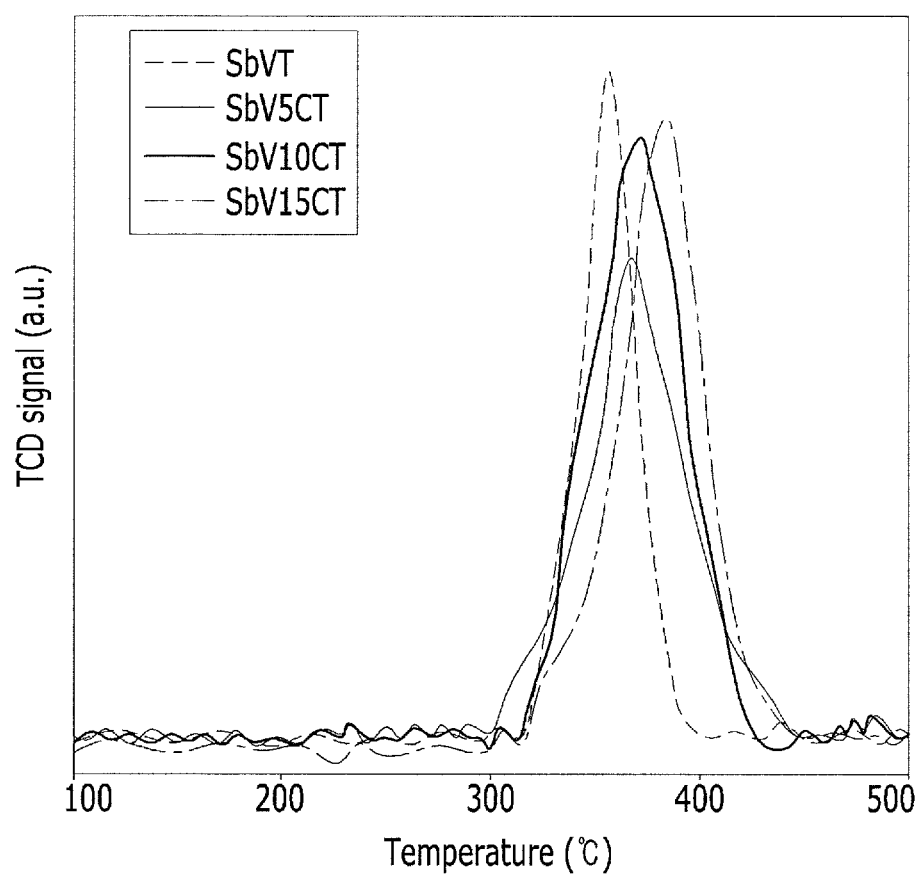
FIG. 4 is a graph illustrating vanadium oxide reduction peaks of the catalysts as a result of H$_2$-TPR (Temperature Programmed Reduction) experiments according to the amount of cerium supported.

FIG. 4 is a graph illustrating vanadium oxide reduction peaks on the catalysts as a result of $H_2$-TPR (Temperature Programmed Reduction) experiments according to the amount of cerium supported, and Table 2 shows the reduction temperatures of the catalysts and values obtained by calculating the amount of hydrogen consumed, according to the amount of cerium supported.

TABLE 2

| Catalyst name | | $T_{max}$ (° C.) | ($H_2$-uptake μmol/g) |
|---|---|---|---|
| Comparative Example 1 | SbVT | 357 | 7.57 |
| Example 1 | SbV5CT | 367 | 9.84 |
| Example 2 | SbV10CT | 372 | 11.33 |
| Example 3 | SbV15CT | 383 | 10.65 |

As known from FIG. 4 and Table 2, as the amount of cerium supported was increased, the reduction temperature ($T_{max}$) was increased. This seems to be caused by interaction of vanadia ($V_2O_5$) and ceria ($CeO_2$) on the surface of the catalyst, and the relationship between the increase in reduction temperature ($T_{max}$) and deNox efficiency seems to be unrelated to each other. However, the area of the reduction peak is an amount of hydrogen consumed, this is a reduction peak from $V^{5+}$ to $V^{3+}$ of the vanadia ($V_2O_5$) species on the catalyst, and as the amount of hydrogen consumed is increased, the deNOx efficiency at low temperature may be increased. Referring to the results of the experiments of FIG. 4 and Table 2, it may be known that a catalyst prepared by mixing about 10% cerium therewith and sintering the mixture showed the largest amount of hydrogen consumed and the deNOx efficiency at low temperature was also the best.

According to an exemplary embodiment as described above, the deNOx efficiency of a deNOx reduction catalyst used in the reduction reaction of nitrogen oxide at low and high temperatures may be improved.

Further, according to an exemplary embodiment, poisoning tolerance characteristics to sulfur are also excellent.

Figure 5:
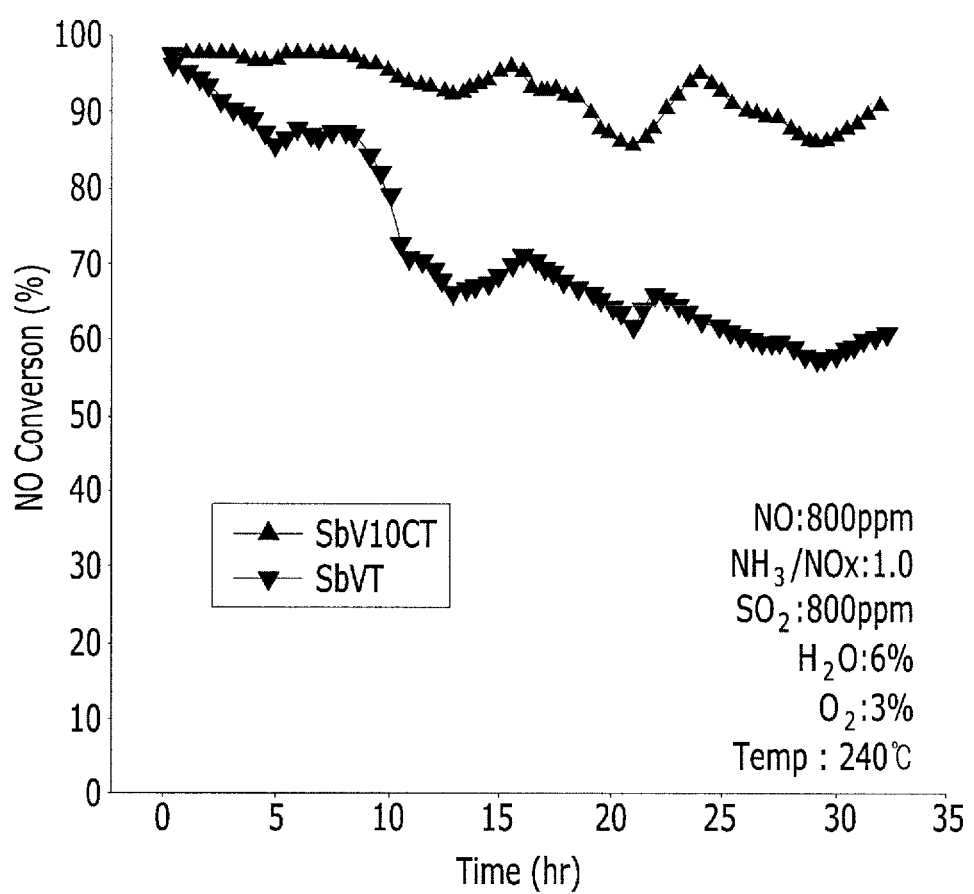
FIG. 5 is a graph measuring the sulfur resistance of a catalyst prepared by mixing 2% vanadium that is a catalyst active component, a 2% precursor of antimony and 10% cerium which are co-catalysts with a titania support and sintering the mixture.

FIG. 5 is a series of data measuring the sulfur tolerance characteristics of a catalyst prepared by mixing about 2% vanadium that is a catalyst active component, a about 2% precursor of antimony and about 10% cerium which are co-catalysts with a titania support and sintering the mixture.

As a result of measuring the deNOx activity according to the sulfur poisoning over time while flowing nitrogen oxide (NO) and ammonia in an amount of about 800 ppm, respectively, and $SO_2$ in an amount of about 800 ppm at a temperature of about 240° C., it may be known from FIG. 5 that a catalyst to which cerium was added was poisoned less than a catalyst to which cerium was not added over time, and thus, sulfur poisoning tolerance characteristics had been greatly improved.

TABLE 3

| | Catalyst name | Surface atomic concentration (%) | | | | | | |
|---|---|---|---|---|---|---|---|---|
| | | Ti | V | Sb | Ce | O | V/Ti | Sb/Ti |
| Comparative Example 1 | SbVT | 20.99 | 1.06 | 1.07 | | 76.87 | 0.05 | 0.05 |
| Example 1 | SbV10CT | 17.23 | 1.41 | 1.06 | 1.29 | 79.01 | 0.08 | 0.06 |

Table 3 is a result of XPS analysis in order to observe the chemical state on the surface of a catalyst prepared by mixing about 2% vanadium that was a catalyst active component and about 2% precursor of antimony and cerium, which were co-catalysts with a titania support and sintering the mixture. As known from Table 3, a catalyst with cerium supported had relatively higher atomic ratios of Va/Ti and Sb/Ti on the surface of the catalyst than those of a catalyst with no cerium supported. Accordingly, it may be known that in the catalyst with cerium supported, vanadia ($V_2O_5$) and antimony had been dispersed on the surface of the catalyst better than in the catalyst with no cerium supported.

Figure 6:
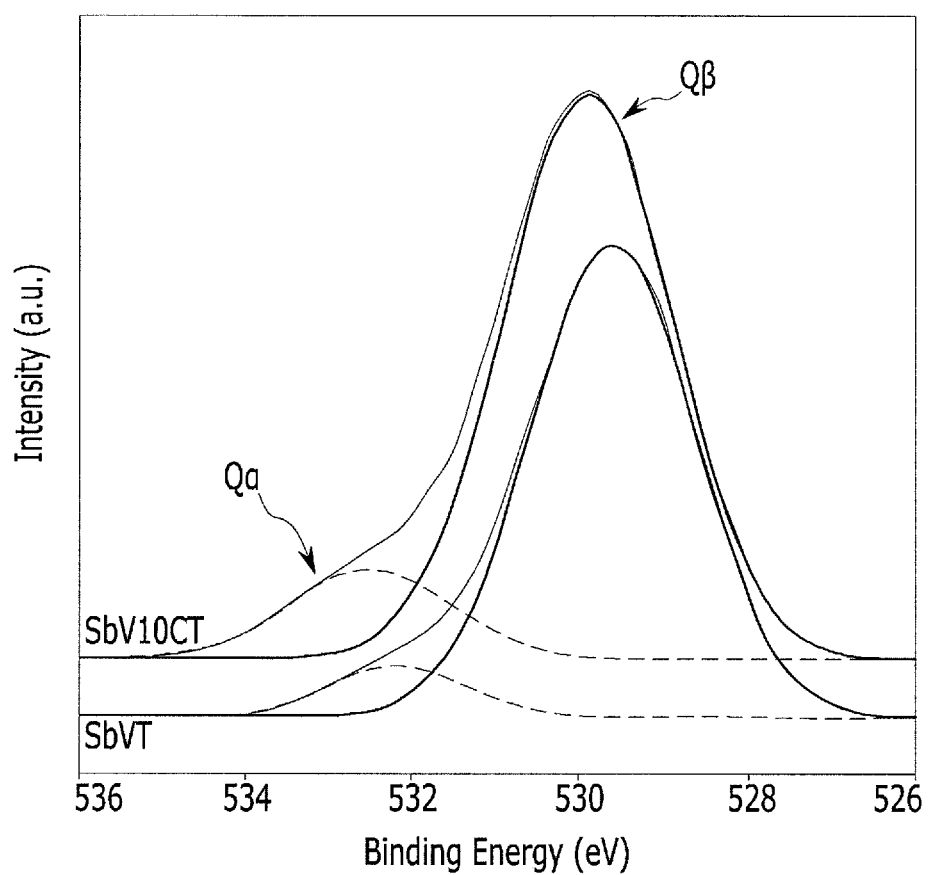
FIG. 6 is a spectrum illustrating the oxygen state on the surface of a catalyst.

FIG. 6 is an O1s spectrum illustrating the oxygen state on the surface of the catalyst, illustrating lattice oxygen (529.3 eV to 530.2 eV, $O_\alpha$) and chemisorbed oxygen (531.3 eV to 531.9 eV, $O_\beta$) on the surface of the catalyst. As known from FIG. 6, it may be known that for the O1s peak, both $O_\alpha$ and $O_\beta$ had been increased in the catalyst with cerium supported. The oxygen chemisorbed on the surface of the catalyst is an active oxygen that serves as a role of oxidizing NO into $NO_2$ in the deNox efficiency, and this is a factor of increasing the deNOx efficiency of the catalyst at low temperature. The experimental result coincides with the result of data of TPR that measures the amount of hydrogen consumed on the surface of the catalyst.

Figure 7A:
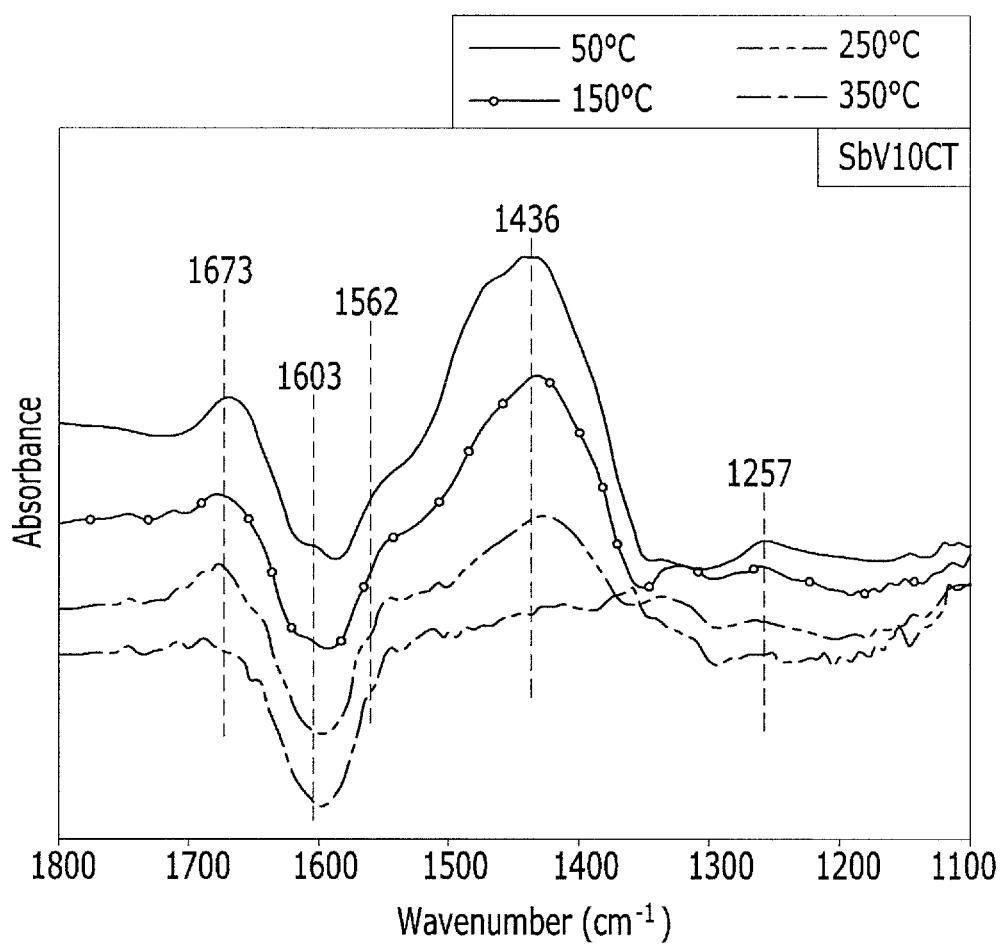
FIGS. 7A and 7B are DRIFTS (diffuse reflectance infrared Fourier Transforms Spectroscopy) graphs for SbV10CT and SbVT catalysts, respectively.
Figure 7B:
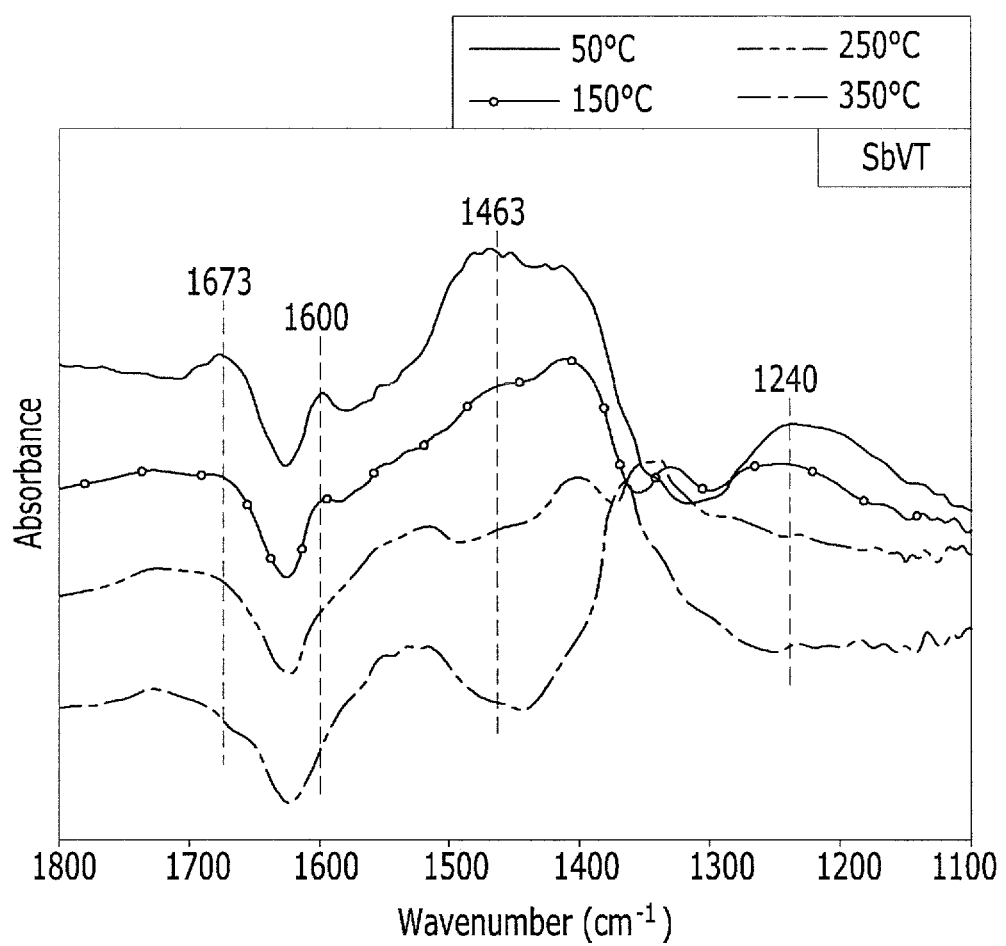

FIGS. 7A and 7B are DRIFTS (diffuse reflectance infrared Fourier Transforms Spectroscopy) graphs for SbV10CT and SbVT catalysts, respectively. A group of peaks at 1330-1380 $cm^{-1}$ were observed on SbV/$TiO_2$ catalyst, which could be assigned to the intermediates of ammonia oxidation species and their intensities increase drastically on SbV/$TiO_2$ catalyst above 250° C. This indicates that the direct oxidation of ammonia is provoked at higher temperatures over SbV/

TiO$_2$, which leads to lower NO$_x$ conversions for SbV/TiO$_2$ catalyst than ceria loaded catalysts above 350° C. temperatures.

Figure 8:
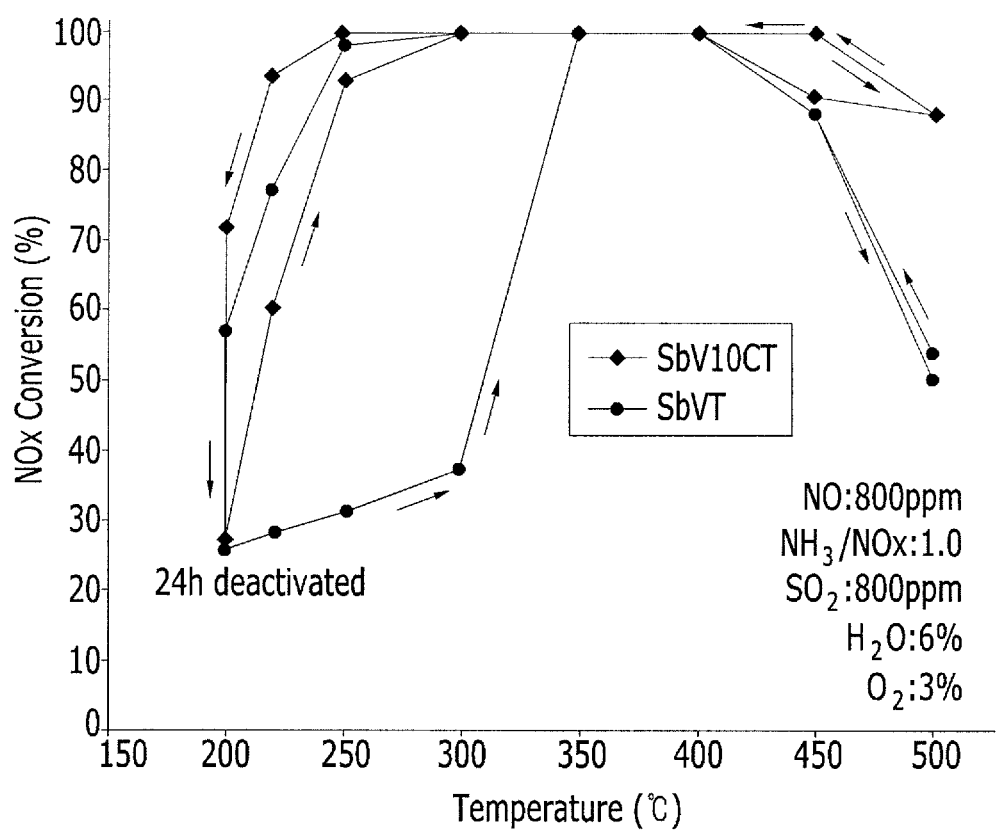
FIG. 8 is a graph illustrating the regeneration effect of the deNOx efficiency of a catalyst according to the temperature.

FIG. 8 is a graph illustrating the result of the deNOx efficiency for the sulfur poisoning tolerance of the catalyst and a regeneration experiment that the deNOx efficiency of the catalyst had been recovered when the temperature was increased after the inactivation of the catalyst. In the case of a catalyst with cerium supported, it may be known that when the catalyst was regenerated by increasing the temperature after the inactivation of the catalyst by sulfur poisoning tolerance for about 24 hours, the catalyst was regenerated into the initial active state of the catalyst within a short time, and it may be known that a catalyst with cerium supported had higher resistance to sulfur poisoning tolerance and a shorter regeneration time than a catalyst with no cerium supported.

Figure 9:
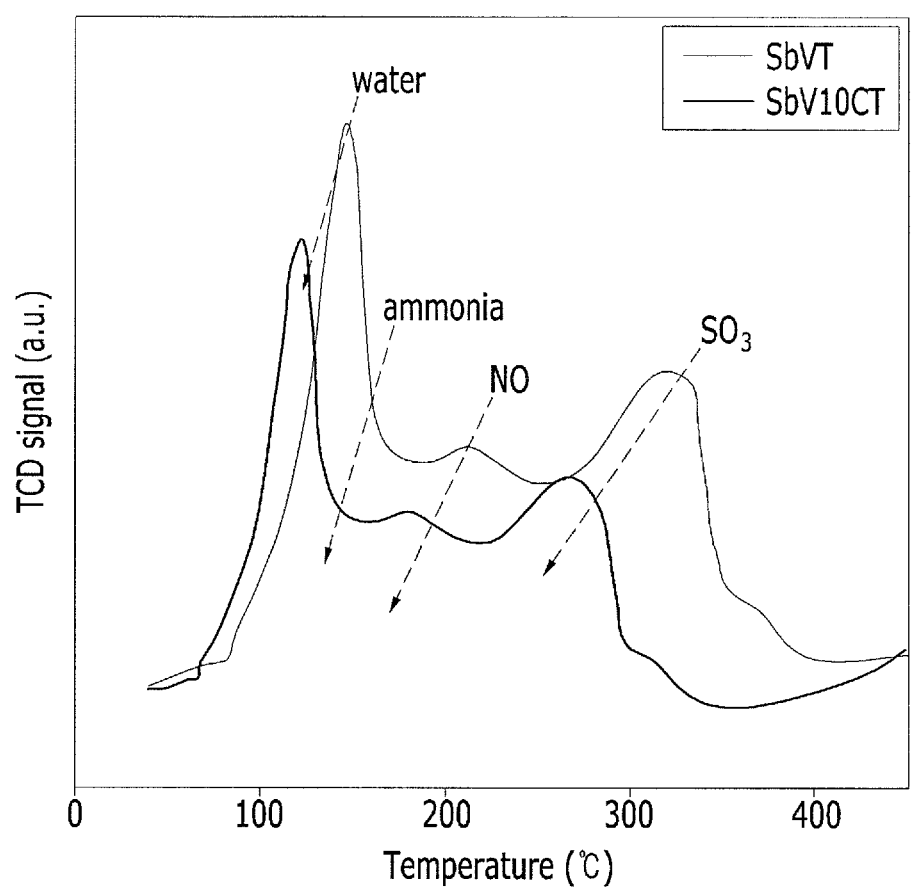
FIG. 9 is a graph illustrating desorption and decomposition of ammonium sulfate salts on the surface of a catalyst according to the temperature through TPD-mass.

FIG. 9 is a graph illustrating the result of desorption and decomposition of ammonium sulfate salts on the surface of a catalyst according to the temperature after the inactivation of the catalyst by sulfur poisoning tolerance through TPD-mass. As known from FIG. 9, it may be known that ammonium sulfate salts produced on the surface of a catalyst with cerium supported at a relatively lower temperature had been decomposed than a catalyst with no cerium supported, when the temperature was increased after the inactivation of the catalyst by sulfur poisoning tolerance. It may be known that the experimental result well coincides with a phenomenon that in the catalyst to which cerium was added, the regeneration of the poisoned catalyst occurs at a relatively low temperature.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for preparing a catalyst consisting of:
    mixing titanium oxide, a vanadium oxide precursor, an antimony precursor, and a cerium precursor to form a mixture wherein titanium oxide is a support, and
    sintering the mixture to prepare the catalyst for decomposing nitrogen oxide,
    wherein the catalyst comprises:
        vanadium oxide at about 1% by weight of the catalyst to about 3% by weight of the catalyst,
        antimony at about 1% by weight of the catalyst to about 3% by weight of the catalyst, and
        cerium at about 3% by weight of the catalyst to about 17% by weight of the catalyst, and wherein the catalysts exhibits a deNOx efficiency of 90% or more at a temperature of about 450° C.

2. The method of claim 1, wherein the cerium is at about 10% by weight of the catalyst.

3. The method of claim 2, wherein the catalyst exhibits a deNOx efficiency of about 90% or more at a temperature of about 225° C.

4. The method of claim 1, wherein the cerium precursor comprises cerium nitrate.

5. The method of claim 1, wherein the antimony precursor comprises antimony trichloride.

6. A catalyst consisting of:
    a support consisting of titanium oxide;
    an active catalyst component consisting of a vanadium oxide precursor, wherein the vanadium oxide precursor comprises about 1% by weight of the catalyst to about 3% by weight of the catalyst; and
    a co-catalyst component consisting of a precursor of antimony and a precursor of cerium, where the antimony precursor comprises about 1% by weight of the catalyst to about 3% by weight of the catalyst, wherein the cerium precursor comprises about 3% by weight of the catalyst to about 17% by weight of the catalyst, and wherein the catalyst exhibits a deNOx efficiency of about 90% or more at a temperature of about 450° C.

7. The catalyst of claim 6, wherein the catalyst is for use in a deNOx reduction reaction for catalyzing decomposition of nitrogen oxide.

8. The catalyst of claim 7, wherein the catalyst can exhibit a deNOx efficiency of about 90% or more at a temperature of about 225° C.

9. The catalyst of claim 6, wherein the cerium comprises about 10% by weight of the catalyst.

* * * * *